(12) United States Patent
Aoun (10) Patent No.: US 9,946,227 B2
(45) Date of Patent: Apr. 17, 2018

(54) REFLECTIVE DEVICES, METHODS AND USES THEREFOR

(71) Applicant: Wissam J. Aoun, Windsor (CA)

(72) Inventor: Wissam J. Aoun, Windsor (CA)

( * ) Notice: Subject to any disclaimer, the term of this patent is extended or adjusted under 35 U.S.C. 154(b) by 0 days.

(21) Appl. No.: 15/185,167

(22) Filed: Jun. 17, 2016

(65) Prior Publication Data

US 2017/0364033 A1 Dec. 21, 2017

(51) Int. Cl.
| | | |
|---|---|---|
| *G04B 47/02* | (2006.01) | |
| *G02B 7/18* | (2006.01) | |
| *G02B 17/00* | (2006.01) | |
| *G02B 27/14* | (2006.01) | |
| *A45D 42/06* | (2006.01) | |
| *G02B 7/182* | (2006.01) | |

(52) U.S. Cl.
CPC ............. *G04B 47/02* (2013.01); *A45D 42/06* (2013.01); *G02B 7/1824* (2013.01); *G02B 17/008* (2013.01); *G02B 27/144* (2013.01)

(58) Field of Classification Search
CPC .......... G04B 47/02; B60R 1/08; A45D 42/00; A45D 42/04; A45D 42/06; G02B 7/182; G02B 5/08; G02B 5/10
See application file for complete search history.

(56) References Cited

U.S. PATENT DOCUMENTS

| | | | | |
|---|---|---|---|---|
| 1,989,437 A | * | 1/1935 | Weisz | A45D 42/16 248/160 |
| 4,177,634 A | * | 12/1979 | Calienes | G04B 19/30 368/232 |
| 4,183,206 A | * | 1/1980 | Porsche | G04B 47/065 368/14 |
| 4,271,492 A | * | 6/1981 | Battista | A47G 1/02 368/10 |

(Continued)

FOREIGN PATENT DOCUMENTS

WO WO2013059880 5/2013

OTHER PUBLICATIONS

Apple Watch Film Cover Unique Specia Style iWatch Mirror Screen Protector (for Apple Watch 38mm). For Sale by PhoneOnSale. Apr. 20, 2016 http://www.amazon.com/Unique-Specia-iWatch-Mirror-Protector/dp/B00X33F7CW.

(Continued)

*Primary Examiner* — Vit W Miska
(74) *Attorney, Agent, or Firm* — Indiana University Maurer School of Law IP Legal Clinic (57) ABSTRACT

Disclosed are timepieces including a first mirror that is at least partially transparent and a second mirror. The second mirror is coupled to the first mirror to articulate with respect to the first mirror about a first axis. A time display is coupled to the second mirror. Also disclosed are reflecting devices including a first mirror and an articulating device coupled to the first mirror. A rotatable device is coupled to the articu- (Continued)

lating device and a second mirror is also coupled to the rotatable device. Additionally disclosed are reflecting kits including a mirror and an articulating device coupled to the mirror. A ring is coupled to the articulating device. The ring has an aperture. A reflective material is configured to be received by the ring. Methods of using these devices and kits are also disclosed.

16 Claims, 7 Drawing Sheets

(56) References Cited

U.S. PATENT DOCUMENTS

| | | | | |
|---|---|---|---|---|
| 4,636,047 A * | 1/1987 | Green | ............... | A45D 42/06 248/467 |
| 4,802,751 A * | 2/1989 | Ueng | ............... | B60R 1/081 248/484 |
| 4,977,548 A * | 12/1990 | Rein | ............... | G04B 19/30 368/10 |
| 6,132,051 A * | 10/2000 | Morell | ............... | B60R 1/081 248/476 |
| 6,305,809 B1 * | 10/2001 | Zadro | ............... | A45D 42/08 248/474 |
| 7,447,118 B1 | 11/2008 | Matos | | |
| 7,794,139 B2 | 9/2010 | Barbier | | |
| D625,930 S * | 10/2010 | Merica | ............... | D6/312 |
| 9,445,657 B2 * | 9/2016 | Crane | ............... | A45D 42/06 |
| 2005/0013204 A1 | 1/2005 | Hiranuma et al. | | |
| 2015/0009665 A1 * | 1/2015 | Durkee | ............... | G04B 47/02 362/231 |

OTHER PUBLICATIONS

Flip bluetooth vibrating watch CW-A1. For sale by Shenzhen Cwell Electronic Technology Co., Limited (Department II). Apr. 20, 2016 http://www.alibaba.com/product-detail/Flip-bluetooth-vibrating-watch-CW-A1_932508674/showimage.html.

* cited by examiner

REFLECTIVE DEVICES, METHODS AND USES THEREFOR

FIELD OF THE DISCLOSURE

The present disclosure relates to a reflecting device. More specifically, the present disclosure relates to reflective surfaces, including mirrors, configured to reflect light. The present disclosure also relates to timepieces, including wristwatches, which include reflective surfaces.

BACKGROUND

Wristwatches and other forms of timepieces may be used to display the time to a user, but some timepieces have also integrated a variety of auxiliary functions such as timers, compasses, and light sources. Although auxiliary functions have been included within timepieces for different purposes, there are some functions not yet provided. For example, the public could benefit from integrating an auxiliary feature into a timepiece for discreetly observing an individual's surrounding.

SUMMARY

Embodiments described herein may relate to, include, or take the form of reflecting devices. Reflecting devices may be used to provide at least one view of at least one scene. In some embodiments, the reflecting device may include two or more mirrors pivotably connected to each other. The reflecting device is configured to reflect light to provide a posterior, lateral, or other view of a scene or environment to a user. In other embodiments, the reflecting device may include a portable accessory, such as a wristwatch, capable of reflecting light from a scene to provide a view of the scene to an observer. In still other embodiments, a reflecting device may include a reflecting kit for attaching to a wearable accessory, such as a wristwatch.

DETAILED DESCRIPTION

In some instances, a user may desire the ability to observe a scene positioned laterally or posteriorly to the individual without completely turning around, or without completely making his or her observation of the scene conspicuous. For example, an individual may want to know whether he or she is being followed without signaling to the follower that he or she is aware of the follower.

Portable devices and accessories may be worn or carried and may function as time keeping devices, orientation devices, or fashion accessories. Portable accessories are often inconspicuous, and can serve multiple purposes. Thus, a portable accessory or device that provides a posterior or lateral view to an observer may allow an individual to scan a scene for a follower while giving the appearance that the individual is merely checking or inspecting the portable accessory or device.

Referring generally to FIGS. 1-6, a reflecting device 10 constructed in accordance with exemplary embodiments is described.

Figure 1:
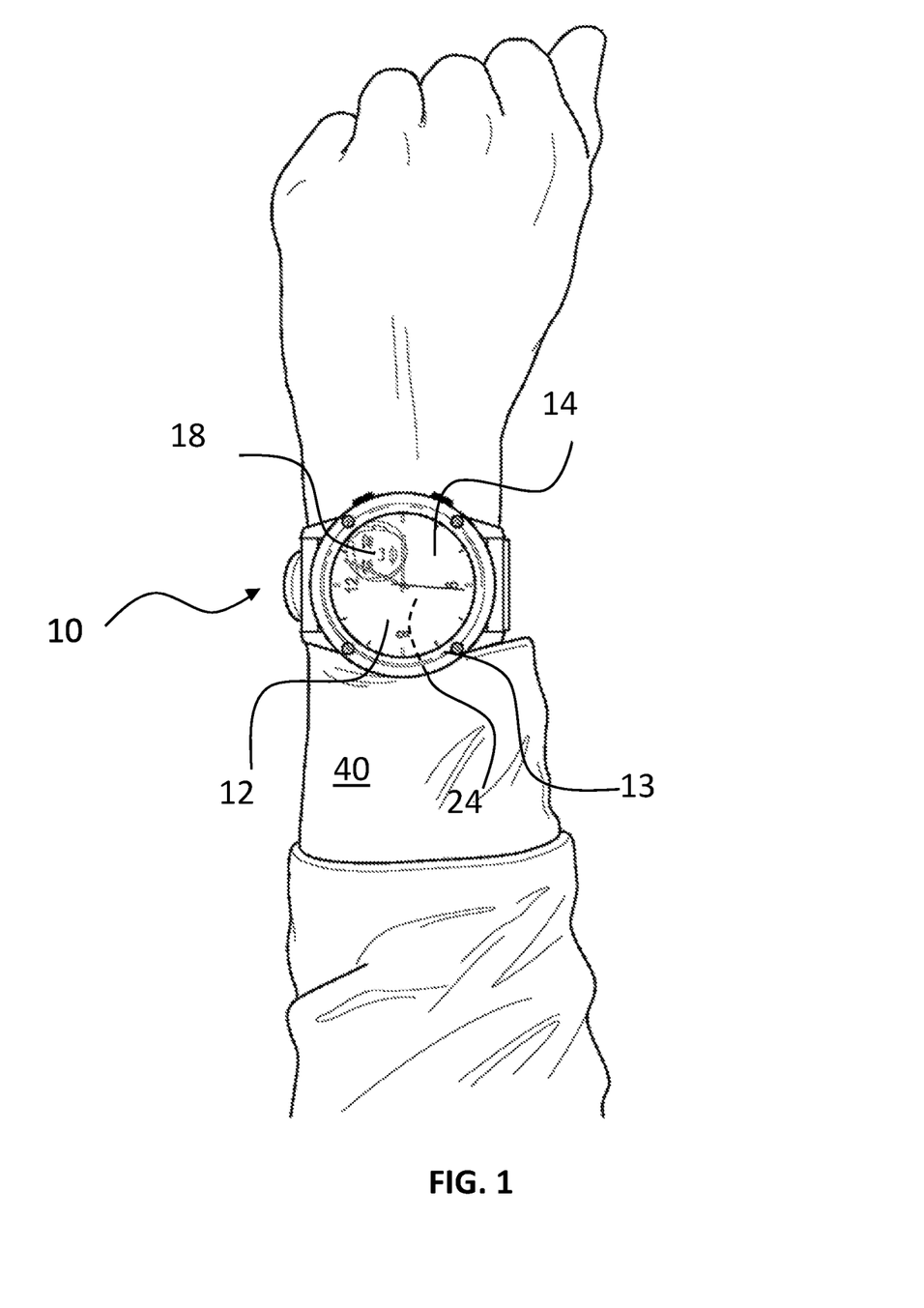
FIG. 1 is a top plan view of a first embodiment of a reflecting device showing a reflecting device being worn by a user and a reflection of a user projecting from a second mirror.
Figure 2:
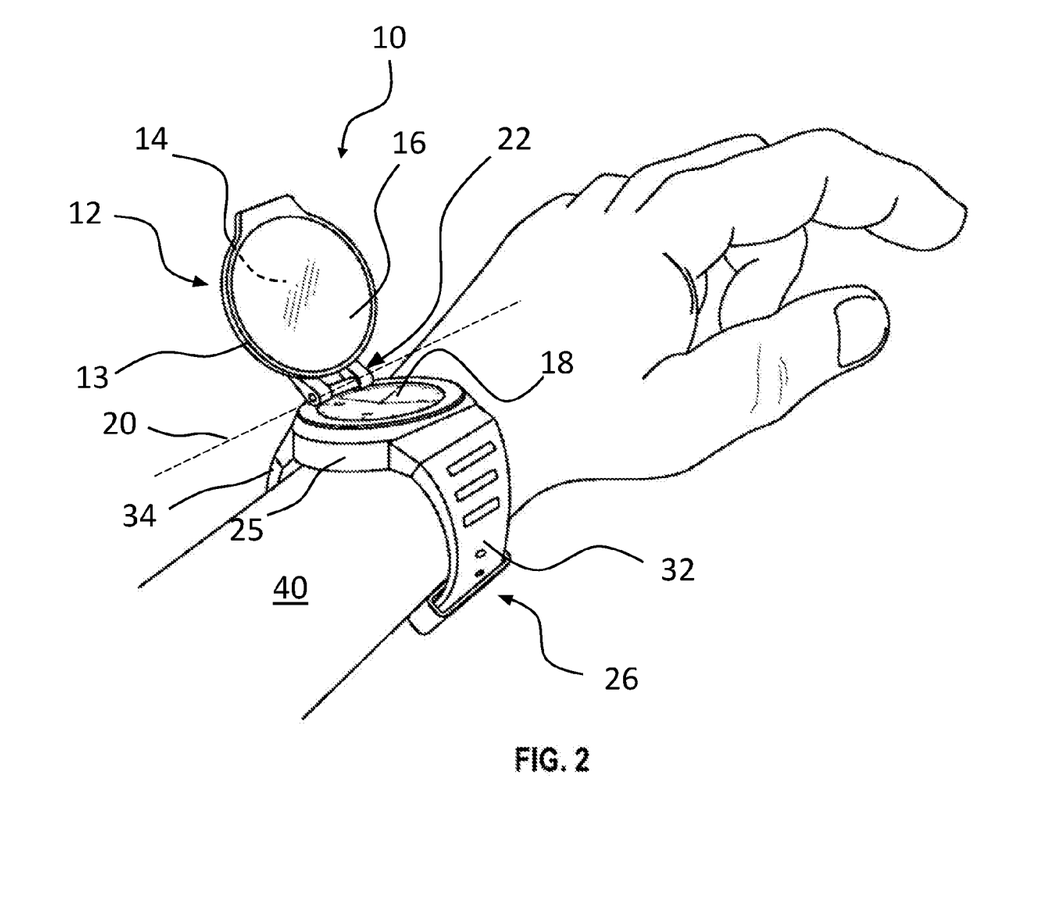
FIG. 2 is a perspective view of the reflecting device of FIG. 1 showing a first mirror in an open position.

A first embodiment (shown in FIGS. 1-2) of reflecting device 10 includes a first mirror 12 that is at least partially transparent. For the purposes of this disclosure, "partially transparent" may mean that a mirror or reflective surface is sufficiently transparent to allow a user to see through the mirror or reflective surface to view or identify at least a part of an object positioned on the other side of the mirror or reflective surface. In some embodiments, first mirror 12 is a piece of glass, crystal, or plastic, further including a reflective film. First mirror 12 may have a substantially circular shape. In the embodiment depicted in FIGS. 1 and 2, first mirror 12 is coupled to, and positioned within, mirror frame 13. In other embodiments, the first mirror may have a rounded shape or any other suitable shape. As shown in FIG. 1, user 40 may see through first mirror 12 to other side of first mirror 12. First mirror 12 may include first surface 14 opposing second surface 16 as shown in FIG. 2. First surface 14 is at least partially transparent and second surface 16 is at least partially reflective. The dashed lines on second surface 16 in FIG. 2 illustrate the reflectivity of second surface 16. Second surface 16 may be a metal film. The metal film may be a deposited layer of metal and/or metal oxide that is sufficient to at least partially reflect an image of a scene.

In the first embodiment, reflecting device 10 also includes second mirror 18. In some embodiments, at least a portion of second mirror 18 includes a metal film. Second mirror 18 may have a circular shape. Second mirror 18 may be smaller than first mirror 12. In FIG. 1, second mirror 18 is coupled to first mirror 12, and as an example of use, user 40 is shown reflected in second mirror 18 as user 40 looks into second mirror 18 through first surface 14.

Second mirror 18 is coupled to first mirror 12 to articulate with respect to first mirror 12 about a first axis 20. In FIG. 2, first mirror 12 is configured to articulate with respect to second mirror 18 to an open position. In the open position, first mirror 12 can reflect a portion of visible light rays from a scene toward second mirror 18. User 40 may set first mirror 12 at any angle sufficient to reflect a portion of visible light rays toward second mirror 18. As shown in FIGS. 1 and 2, reflecting device 10 may also comprise watch body 25. First mirror 12 is also configured to articulate with respect to second mirror 18 to a closed position. FIG. 2 depicts first mirror in the closed position. First mirror 12 and mirror frame 13 may be sized and positioned to match watch body 25, such that when first mirror 12 is in the closed position, first mirror 12 and mirror frame 13 cover watch body 25.

Articulating device 22 is coupled to first mirror 12 at first axis 20 in FIG. 2. Articulating device 22 allows first mirror 12 to articulate at first axis 20 in respect to second mirror 18.

A suitable articulating device 22 may be a hinge, a dual-axis pivot connection, a universal joint connector, a swivel ball-joint connector, or a combination thereof. Articulating device 22 is a hinge in FIG. 2.

Time display 24 is coupled to second mirror 18 in FIG. 1 and FIG. 2. Time display is positioned within watch body 25. When reflecting device 10 includes time display 24, reflecting device 10 may also be referred to as a "timepiece." Time display 24 is visible through first mirror 12 as shown in FIG. 1. In FIG. 1 and FIG. 2, time display 24 is an analog time display.

In some embodiments, strap 26 is coupled to time display 24. Strap 26 of FIG. 1 and FIG. 2 is a wristwatch strap, or wristwatch band, however other types of straps may be acceptable. When reflecting device 10 includes strap 26 and time display 24, reflecting device 10 and strap 26 together may be referred to as a "wristwatch." Strap 26 may be of the length suitable for attaching to a human wrist. In other embodiments, strap 26 may be suitable for attaching to a human arm, or bicycle handle, or other objects. Strap 26 may also be composed of two separate portions with time display 24 between first portion 32 and second portion 34 of strap 26. For example in FIG. 2, strap 26 includes first portion 32 of strap 26 on one side of time display 24 and second portion 34 of strap 26 on the other side of time display 24. Strap 26 may include embellishments such as a clasp, slots, or apertures. Strap 26 may be made of a material that is at least semi-flexible.

A second embodiment is shown in FIGS. 3-6. The second embodiment also includes first mirror 12, second mirror 18, first axis 20, articulating device 22, time display 24, and strap 26.

Figure 3:
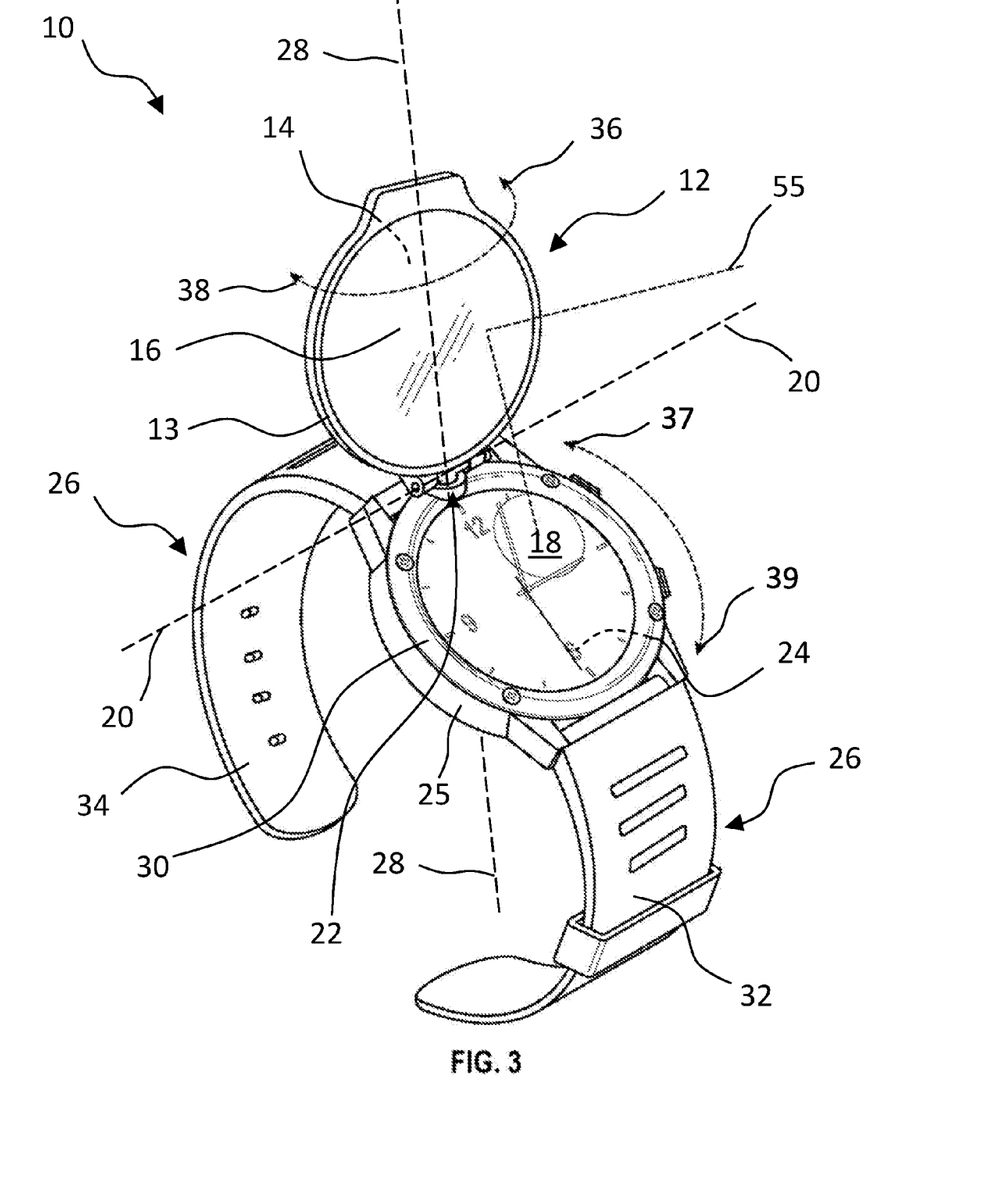
FIG. 3 is a perspective view of a second embodiment of a reflecting device showing a first mirror in the open position and a bezel, with light reflecting from the first mirror to a second mirror.

In FIGS. 3-6, articulating device 22 is a dual-axis pivot connector, such as a universal joint connector. Articulating device 22 allows first mirror 12 to articulate at first axis 20 with respect to second mirror 18 similar to the embodiment illustrated in FIGS. 1-2. However, first mirror 12 is also configured to swivel about second axis 28 as shown in FIG. 3. The arrows connected by a dashed curve, adjacent to first mirror 12 in FIG. 3, show first direction 36 and second direction 38 of movement of first mirror 12 around second axis 28. First mirror 12 may be configured to swivel about second axis 28 to positions less than 90 degrees, about 90 degrees, between 90 and 180 degrees, about 180 degrees, or more than 180 degrees in each direction. First mirror 12 may also be configured to swivel about second axis 28 at about 360 degrees in a full circle.

Figure 4:
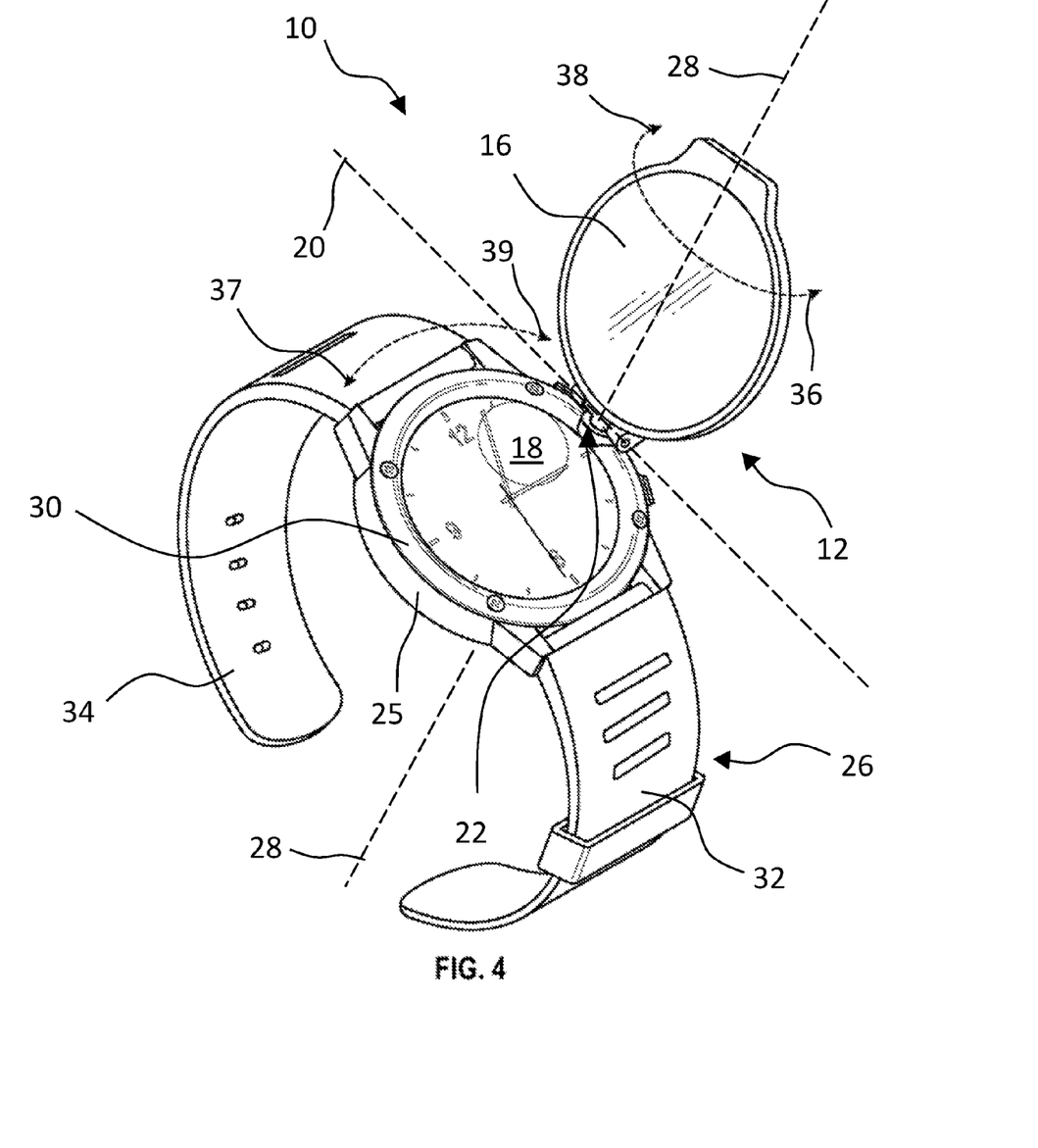
FIG. 4 is a perspective view of the reflective device of FIG. 3 showing the first mirror in the open position. The bezel is rotated 90 degrees.

Second embodiment also includes rotatable device 30 coupled to articulating device 22. (FIG. 3) Articulating device 22 is situated between first mirror 12 and rotatable device 30. Second mirror 18 is also coupled to rotatable device 30. The arrows connected by a dashed curve adjacent to the rotatable device 30 in FIG. 3 show first and second directions 37, 39 of possible movement of the rotatable device 30. For example, FIG. 4 shows rotatable device 30 rotated 90 degrees in a circular manner around second mirror 18. Since first mirror 12 is attached to rotatable device 30, first mirror 12 also rotates 90 degrees in a circular manner about second mirror 18 with rotatable device 30. Although rotatable device 30 of FIG. 3 is rotatable in both first direction 37 and second direction 39, rotatable device 30 may rotate solely in either first direction 37 or second direction 39. Rotatable device 30 is rotatable about second mirror 18. Rotatable device 30 may be rotatable around second mirror 18 to positions of about 0 degrees to about 360 degrees from the starting position. For example, in FIG. 3, rotatable device 30 is shown at a position of about 0 degrees relative to the starting point, whereas in FIG. 4, rotatable device 30 is shown at a position of about 90 degrees relative to starting point.

First mirror 12 may also be configured to articulate with respect to rotatable device 30 about first axis 20 to define an angle with rotatable device 30 of about 0 degrees to about 360 degrees. The 90 degree-angled dashed line 55 in FIG. 3 indicates an example of a reflection of at least a portion of light from first mirror 12 to second mirror 18, with first mirror 12 set at a 90 degree angle with rotatable device 30 and second mirror 18.

Rotatable device 30 may be a circular metal ring, such as a watch bezel, and may include an embellishment such as a groove, a ridge, a screw, or a combination thereof. In FIG. 3, rotatable device 30 is a bezel suitable for attachment to a standard wristwatch. Rotatable device 30 may be attachable to a portable accessory, such as a wristwatch.

Figure 5:
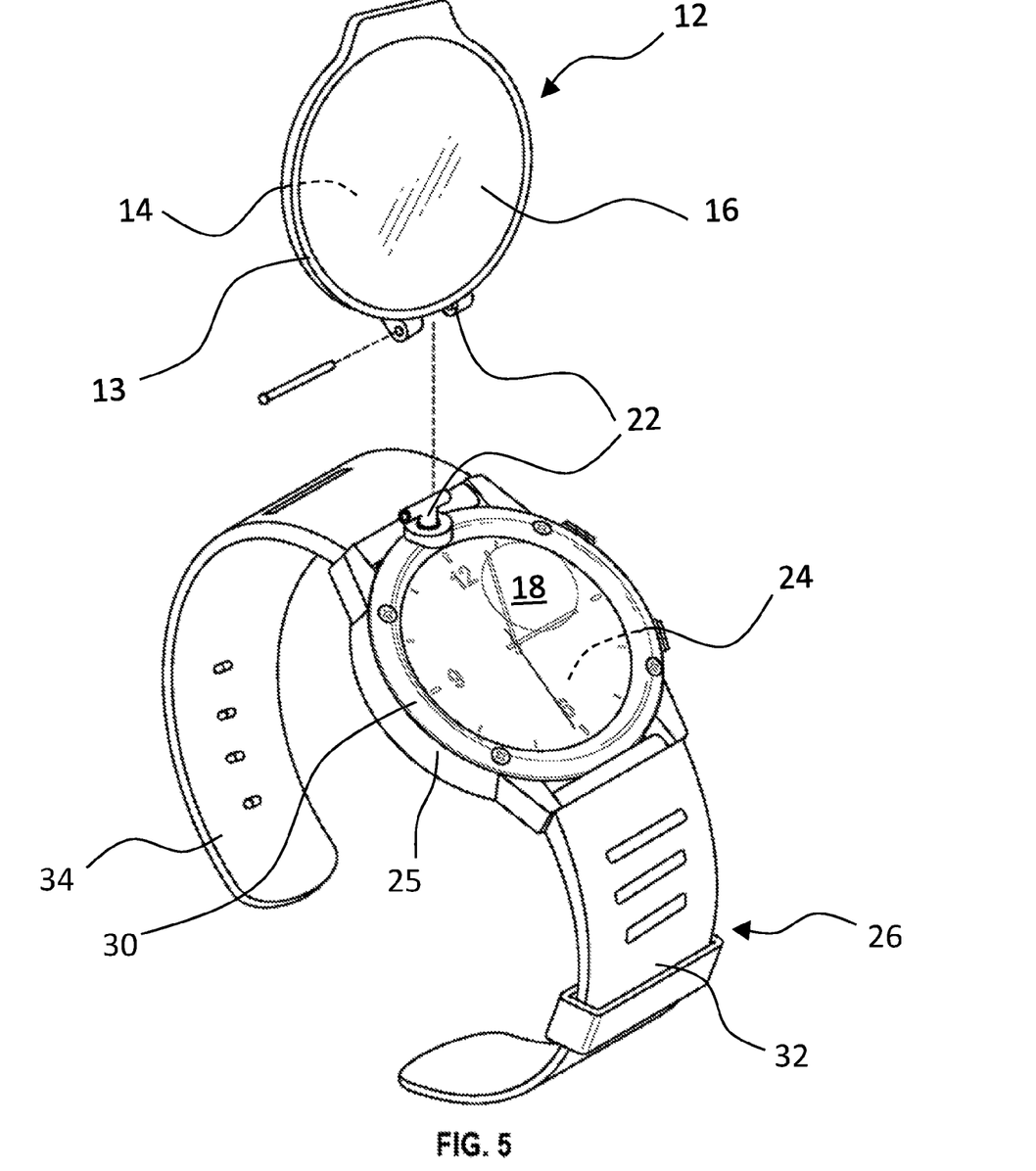
FIG. 5 is an assembly perspective view of the reflective device of FIG. 3 showing the first mirror detached from the bezel with a pin release device.

The second embodiment additionally provides for detachment of first mirror 12 from rotatable device 30 as shown in FIG. 5. In some embodiments, first mirror 12 is detachable from the rotatable device 30. The point of detachment of first mirror 12 may be at or near first axis 20. Suitable methods of detachment include, but are not limited to, a pin release device. In FIG. 5, the dual-axis pivot connector articulating device 22 includes a pin release device. After first mirror 12 is detached from rotatable device 30 in FIG. 6, user 40 may reflect at least a portion of light from first mirror 12 to second mirror 18 to view an image or scene.

A third embodiment includes a reflecting kit. The kit may include one or more elements that are analogous to the elements of the embodiments depicted in FIGS. 1-2, and FIGS. 3-6. For example, the kit includes a first mirror, and an articulating device coupled to the first mirror. A ring is coupled to the articulating device. The ring may be a bezel. The ring has an aperture therein. A reflective material is configured to be received by the aperture. User 40 may place the reflective material within the aperture of the ring. The reflective material may include metal. The reflective material may include an adhesive material, such as glue. In some embodiments of a reflecting kit, both the ring and the reflective material have a similar shape. The reflective material is of a size to fully situate within the ring. The reflective material may be a strip.

The reflecting kit may be configured to attach to a watch body. In some embodiments, the ring may attach to a watch face, or a watch case. For example, the ring may be a bezel for a standard wristwatch.

Figure 6:
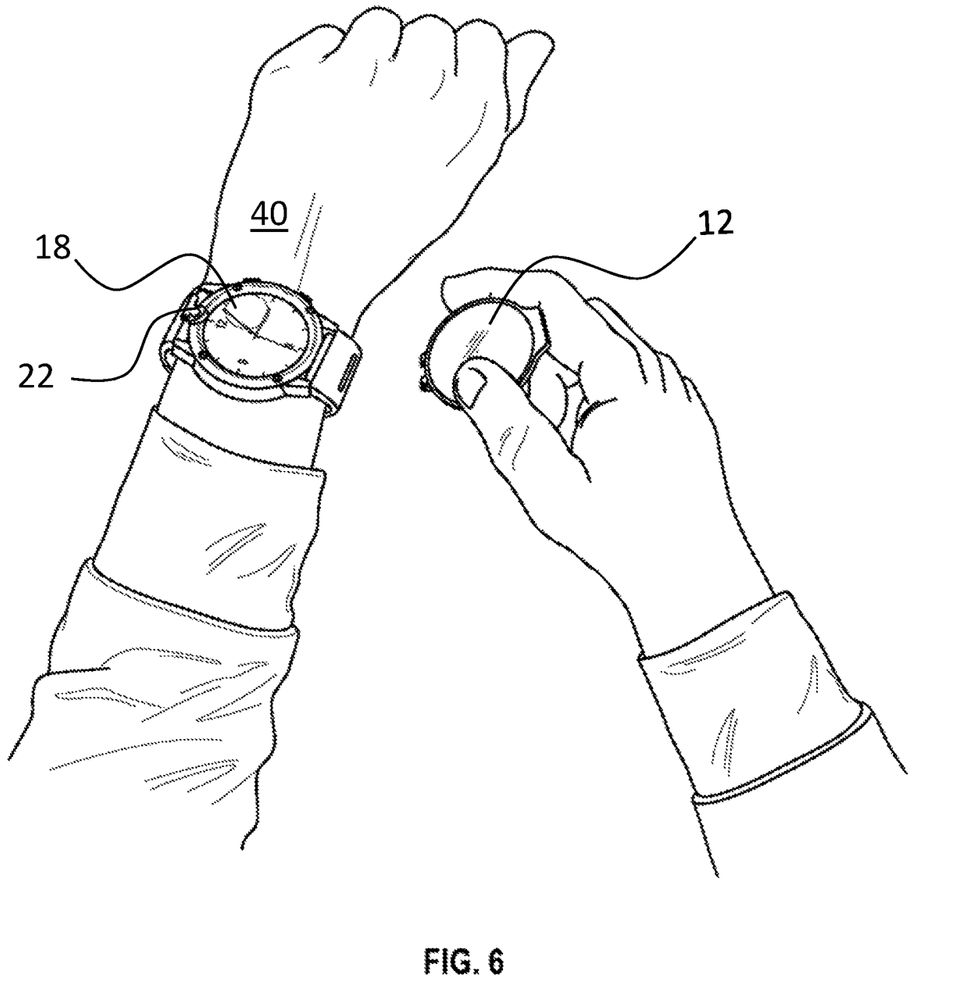
FIG. 6 is a perspective view of the reflective device of FIG. 3 showing the user reflecting light from the first mirror to the second mirror while the first mirror is detached from the bezel.
Figure 7:
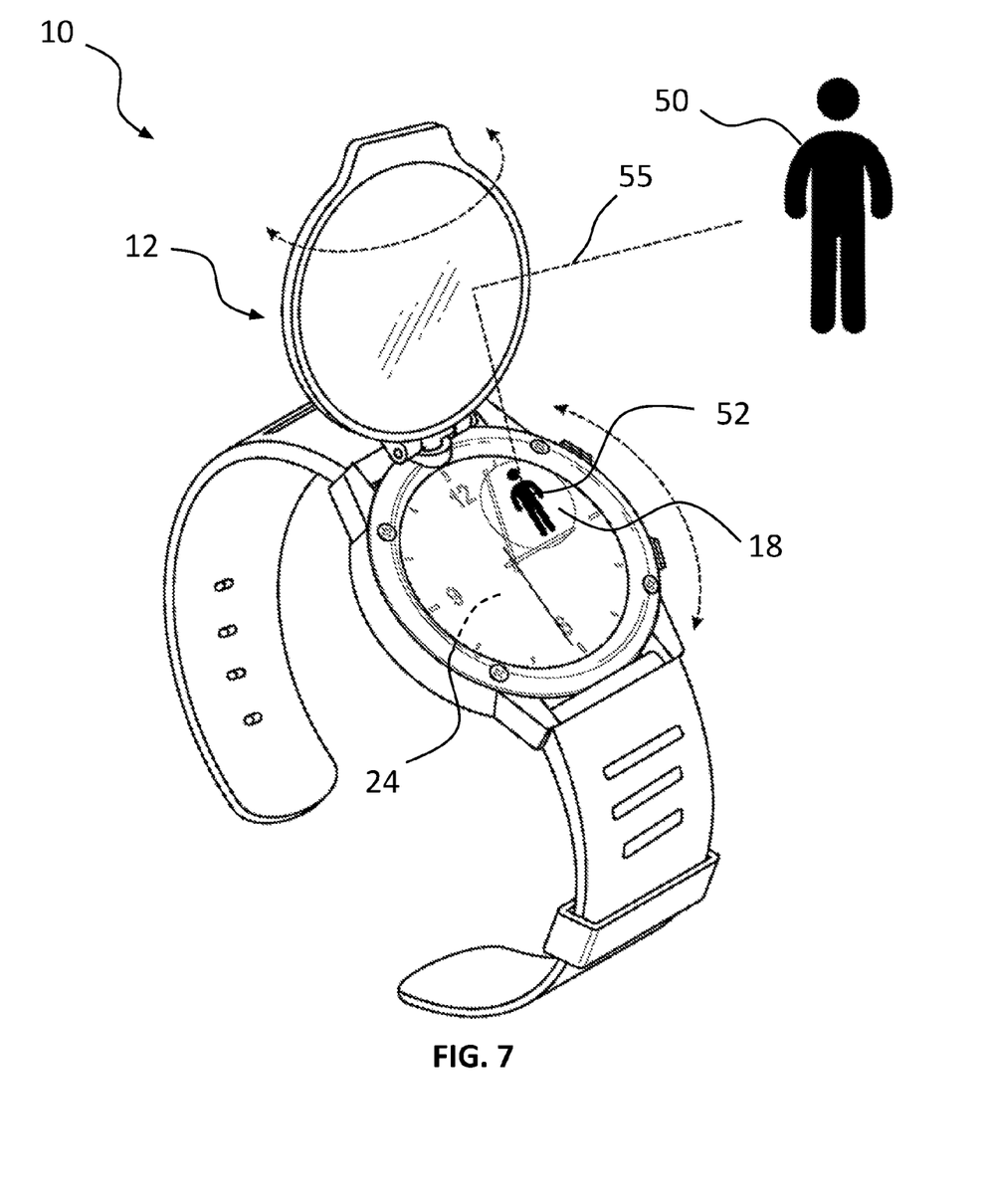
FIG. 7 is a perspective view of one embodiment of a reflective device reflecting an image of a scene to a user.

Referring to FIG. 7, some of the instant reflecting devices 10 may be used as spy devices. For use as a spy device, reflecting device 10 or kit is attached to a wrist of user 40 (FIG. 6). User 40 may be a human. As illustrated in FIG. 1, when reflecting device 10 is closed, user 40 may view second mirror 18 or reflective material through first mirror 12 to check time display 24 and/or second mirror 18 or reflective material. As illustrated in FIG. 7, user 40 may flip open reflecting device 10 by lifting first mirror 12 away from second mirror 18 or reflective material. When flipped open, user 40 may view second mirror and/or reflective material. User 40 configures a location of first mirror and raises an arm so that a scene 50 behind user 40 is reflected from first mirror 12 to second mirror 18 or reflective material. The configuration allows user 40 to see behind corners like a periscope. User 40 looks at second mirror 18 or reflective material as if checking time display 24, but instead views a reflection 52 of the scene 50 behind user 40.

The disclosure provided herein can be more fully understood from the detailed description and accompanying FIGS. 1-6 which form a part of this application. Reference made to figures is intended to aid in the understanding of the disclosure described herein, and should not be construed as limiting. In addition, where conditions are proposed in reference to a figure, these are supplied as an example and variation is within the scope of the disclosure. The following terms and definitions are herein provided.

The disclosure is described in an illustrative manner, and it is to be understood that the terminology which has been used is intended to be in the nature of words of description rather than of limitation.

Throughout this specification, the word "comprise," or variations such as "comprises," "comprising," "includes," "including," "has," and "having" will be understood to imply the inclusion of a stated element or group of elements but not the exclusion of any other element or group of elements. The terms and expressions used in the description and in the claims are meant to have the meaning normally used by a person skilled in the art.

The articles "a" and "an" preceding an element or component of the disclosure are intended to be nonrestrictive regarding the number of instances of the element or component. Therefore "a" or "an" should be read to include at least one, and the singular word form of the element also includes the plural. The term "kit" refers to a combination of at least two elements.

The term "coupled" is not limited to a mechanical or physical coupling. Coupled elements are not required to have a direct physical connection with each other. The definition of the term coupled includes connected, either directly or indirectly. The term coupled does not imply or necessitate a direct connection between the two coupled elements. Additionally, the term coupled does preclude the use of an intermediate element or more than one intermediate element between the coupled elements.

The disclosure is not restricted to the described embodiments and FIGS. 1-6, but may be varied freely within the scope of the claims. The present disclosure may be embodied in other specific forms, and accordingly, reference should be made to the appended claims, rather than to the forgoing specification, as indicating the scope of the disclosure. Modifications and variations of the present invention are possible in light of the above teachings. It is, therefore, to be understood that within the scope of the appended claims, the disclosure may be practiced otherwise than as specifically described in the embodiments.

What is claimed is:

1. A timepiece a first mirror that is at least partially a second mirror coupled to the first mirror to articulate with respect to the first mirror about a first axis, and a time display coupled to the second mirror.

2. The timepiece of claim 1, wherein the first mirror includes a first surface opposing a second surface, the first surface is at least partially transparent and the second surface is at least partially reflective.

3. The timepiece of claim 2, wherein the second surface is a metal film.

4. The timepiece of claim 1, wherein at least a portion of the second mirror includes a metal film.

5. The timepiece of claim 1, further comprising a mirror frame coupled to the first mirror, the first mirror being positioned within the mirror frame.

6. The timepiece of claim 1, further comprising a watch body, and wherein the first mirror is substantially the same shape and size as the watch body.

7. The timepiece of claim 1, further comprising a strap coupled to the time display.

8. The timepiece of claim 1, wherein the time display is an analog time display.

9. A reflecting device comprising: an articulating device coupled to the first a rotatable device coupled to the articulating device, a second mirror coupled to the rotatable device, and a variable circumference band supporting the rotatable device, the variable circumference band being sized to fit a user wrist.

10. The reflecting device of claim 9, wherein the first mirror is configured to swivel about a second axis.

11. The reflecting device of claim 9, wherein the first mirror is configured to articulate with respect to the rotatable device and to define an angle with the rotatable device of 0 degrees to 360 degrees.

12. The reflecting device of claim 9, wherein the first mirror is configured to articulate with respect to the second mirror to an open position in which the first mirror is configured to reflect a portion of visible light rays from a scene toward the second mirror.

13. The reflecting device of claim 9, wherein the articulating device is at least one of a hinge, a dual axis pivot connection, a universal joint connector, and a swivel ball-joint connector.

14. The reflecting device of claim 9, wherein the first mirror is detachable from the rotatable device.

15. The reflecting device of claim 9, wherein the rotatable device is a bezel.

16. The reflecting device of claim 9, wherein the rotatable device is rotatable around the second mirror.

* * * * *